United States Patent
Blomberg et al.

(10) Patent No.: US 6,242,065 B1
(45) Date of Patent: Jun. 5, 2001

(54) LENS BLANKS FOR OPHTHALMIC ELEMENTS

(75) Inventors: Chris Blomberg, Minneapolis; Gert Levin; Sujal Bhalakia, both of Plymouth, all of MN (US)

(73) Assignee: BMC Vision-Ease Lens, Inc., Minneapolis, MN (US)

( * ) Notice: Subject to any disclaimer, the term of this patent is extended or adjusted under 35 U.S.C. 154(b) by 0 days.

(21) Appl. No.: 09/167,762

(22) Filed: Oct. 7, 1998

(51) Int. Cl.[7] ....................................... G02C 7/02
(52) U.S. Cl. .................. 428/64.1; 351/159; 351/172; 428/66.7
(58) Field of Search ..................... 351/159, 172, 351/177; 428/64.1, 66.7

(56) References Cited

U.S. PATENT DOCUMENTS

| | | | |
|---|---|---|---|
| 2,618,200 | 11/1952 | Clave et al. | 88/54 |
| 2,632,725 | 3/1953 | Marks et al. | 154/128 |
| 2,833,680 | 5/1958 | Kneeling | 154/2.65 |
| 3,195,145 | 7/1965 | Tisher et al. | 351/159 |
| 3,253,921 | 5/1966 | Sawdey | 96/73 |
| 4,304,923 | 12/1981 | Rousseau | 560/26 |
| 4,307,184 | 12/1981 | Beretta et al. | 430/512 |
| 4,576,908 | 3/1986 | Vallarino | 430/512 |
| 4,645,317 | 2/1987 | Frieder et al. | 351/164 |
| 4,828,769 | 5/1989 | Maus et al. | 264/1.3 |
| 4,867,553 | 9/1989 | Frieder | 351/172 |
| 4,883,548 | 11/1989 | Onoki | 156/99 |
| 4,892,403 | * 1/1990 | Merle | 351/168 |
| 4,892,903 | 1/1990 | Himes | 524/488 |
| 4,927,480 | 5/1990 | Vaughan | 156/228 |
| 4,969,729 | 11/1990 | Merle | 351/168 |
| 4,971,892 | 11/1990 | Ali et al. | 430/281 |
| 4,987,287 | * 1/1991 | Jack | 219/121.69 |
| 5,373,332 | * 12/1994 | Shimizu et al. | 351/159 |
| 5,399,227 | 3/1995 | Abrams | 156/539 |
| 5,433,810 | 7/1995 | Abrams | 156/273.7 |
| 5,805,263 | 9/1998 | Reymondet et al. | 351/159 |
| 5,808,721 | 9/1998 | Wood et al. | 351/159 |
| 5,959,761 | * 9/1999 | Perrott et al. | 359/244 |

FOREIGN PATENT DOCUMENTS

| | | | |
|---|---|---|---|
| 0556646 | * | 8/1993 | (EP) . |
| 1195651 | * | 6/1970 | (GB) . |
| 2260937 | * | 5/1993 | (GB) . |

* cited by examiner

Primary Examiner—Nasser Ahmad
Assistant Examiner—Derek Jessen
(74) Attorney, Agent, or Firm—Mark A. Littman & Associates

(57) ABSTRACT

A polymeric front optical element blank is provided which may be laminated to a rear optical element blank. The polymeric front blank comprises an optical element having an exterior convex surface and an interior concave surface, with an edge between the exterior convex surface and the interior concave surface. The optical is provided with at least two projections which extend away from and higher than the edge on a side of the optical element having the concave surface. These projections assist in aligning an back optical element during lamination so that the two lenses will not move out of optical registry during lamination, especially where centrifugal forces are used to spread an adhesive between the front and rear lenses. It is preferred that there are at least three projections extending away from and higher than the edge on a side of the optical element having the concave surface.

24 Claims, 3 Drawing Sheets

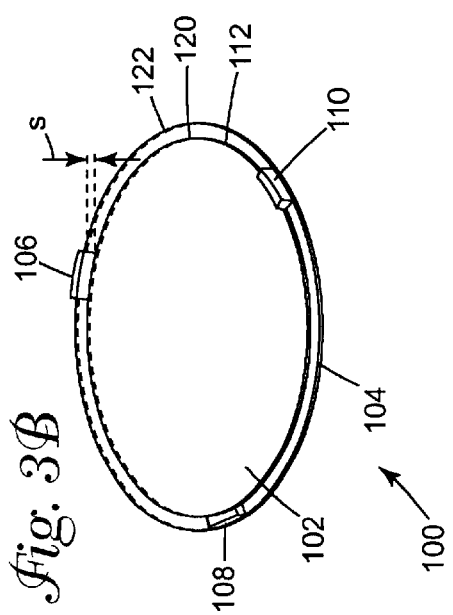
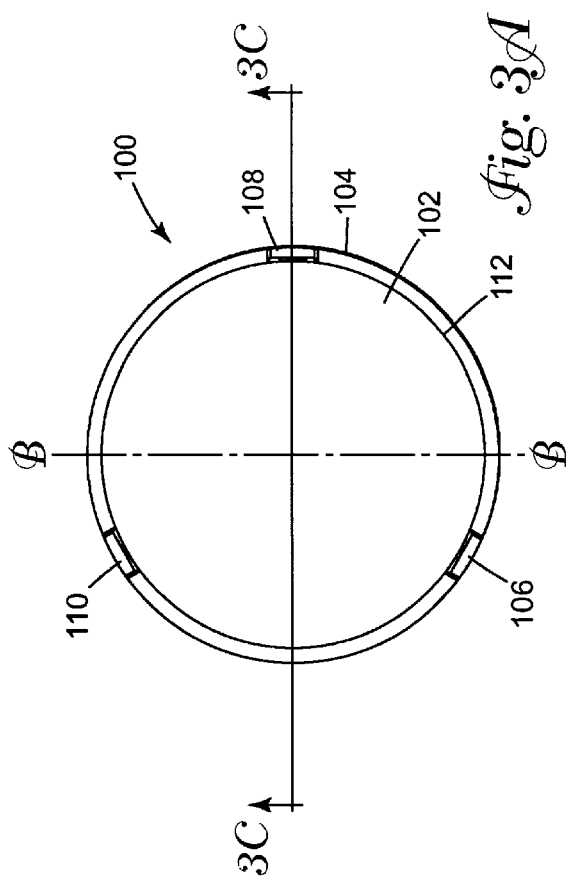
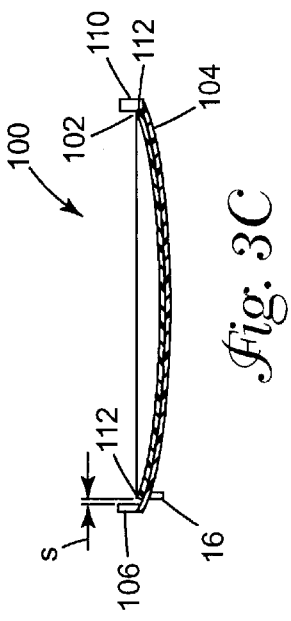

LENS BLANKS FOR OPHTHALMIC ELEMENTS

BACKGROUND OF THE INVENTION

1. Field of the Invention

The present invention relates generally to lens blanks for forming ophthalmic elements and the lamination of thermoplastic molded articles in the formation of ophthalmic elements. The invention is particularly designed to provide a finished multifocal or progressive lens with anti-reflective or abrasion resistant coatings at a commercial shop in less than twenty minutes.

2. Background of the Art

The present invention finds utility in a range of materials to be joined by adhesive securement, and it is applied most advantageously to molded thermoplastic articles such as lenses, especially ophthalmic lenses, and optical disks.

Lenses are used for a wide variety of purposes. For example, microscopes, telescopes, magnifying glasses and other optical instruments, as well as ophthalmic spectacles, employ lenses. The following discussion focuses on the most preferred embodiment of the present invention, ophthalmic lenses.

Vision-corrective, prescription (Rx) spectacle lenses or ophthalmic lenses increasingly employ plastic lens materials instead of the more traditional glass. In fact, in the United States, the demand for plastic lenses is multiples of that for glass lenses. This is because:

1. plastic is lighter than glass, which is particularly advantageous where stronger prescriptions and thicker lenses must be used;
2. durable abrasion-resistant coatings have become available for plastic;
3. plastic can be provided in a wide range of fashionable colors and gradient-density tints; and
4. production techniques have improved so that plastic lenses can be manufactured at higher rates, with more automation, and lower costs.

The relatively lighter weight and corresponding improved wearer comfort of plastic lenses are the most important considerations by the consumer. Since a nominal lens thickness (typically 2.0–2.2 mm) is the same for glass and plastic, plastic lenses' lighter weight is a direct result of plastic's lower density compared to that of glass. This factor holds true for all equivalent prescriptions in glass and plastics, but becomes particularly important when higher-powered corrections are required or when larger spectacle frames are chosen, requiring larger lens diameters and requiring greater thickness at the exterior (or interior) portion of the lens to continue the prescription curvature of the correction.

One method by which plastic prescription lenses are currently manufactured is by individually casting polycarbonate resins, or casting and curing allylic (or other ethylenically unsaturated) resins. Polycarbonate thermoplastic lenses have started to replace both cast-thermoset plastic and traditional glass lenses because of their lower density and higher refractive index. Polycarbonate lenses of the same nominal thickness provide even lighter weight than the cast-allylic plastics, and are of a much lower weight than glass. Additionally benefits result from this resin class because polycarbonate tends to have far greater impact strength and breakage resistance than any clear polymeric materials presently used for lenses, and even thinner lenses (in the range of 1.5–2.0 mm) are presently available, with the potential for even higher wearer preference.

Another method by which ophthalmic lenses, and especially ophthalmic lenses having segmented (bifocal or trifocal) prescriptions or continuous prescriptions (with a smooth gradation between various prescriptions) can be manufactured is by laminating sets of at least one interior lens blank and at least one exterior lens blank, with each of the interior and exterior lens blanks providing a specific contribution to the final prescription. Composite eyeglass lenses have been formed with this principle by bonding together front and rear lenses, as suggested in U.S. Pat. No. 2,618,200. A device and method for accomplishing this process has been suggested in U.S. Pat. No. 4,927,480. Generally, the bonding process involves placing a curable adhesive on the concave interface surface of the front lens; pressing the convex interface surface of the rear lens against the adhesive in the front lens to spread the adhesive throughout the space between the two lenses; and curing the adhesive to bond the lenses together, forming a composite lens which is then trimmed to fit within an eyeglass frame.

Even after individual lens blanks of good optical properties have been manufactured, it is equally important to form them into ophthalmic lenses for use by the customer. Segmented and progressive ophthalmic lenses must also be capable of construction from these lens elements. For example, U.S. Pat. Nos. 4,883,548; 4,867,553; and 4,645,317 show the formation of laminated ophthalmic lenses from at least two separate lens elements which are selected from a reserve and then associated to match a particular description. The at least two lens elements (one front and one rear lens) are adhesively secured together, with a photosetting resin and photinitiator suggested for the process (e.g., U.S. Pat. Nos. 4,883,548 and 4,867,553).

Especially when the desired composite lens includes a cylindrical component that must be properly oriented to correct for astigmatism and a bifocal or progressive focal region that must be properly positioned for reading purposes, the existing methods and equipment have fallen short of the desired optical accuracy. Existing laminating equipment, for example, does not readily accommodate eccentric positioning and bonding of the front and rear lenses, which can be necessary in some cases. Also, existing methods and equipment have been inconvenient in operation and have put the desirable accuracies beyond practical reach for some composite eyeglass lenses. U.S. Pat. No. 5,433,810 describes lamination or bonding together of front and rear lenses to form a composite eyeglass lens to address these perceived problems. It is asserted in U.S. Pat. No. 5,433,810 that a described new and better way of mounting, aligning, and bonding together composite eyeglass lenses improved on the accuracy attainable. That composite lens laminating system includes a front lens platform on a movable stage and a rear lens holder that is rotationally adjustable on a laminating axis and is movable along the laminating axis to press the rear lens against the front lens. Accurate positioning of each lens is assured by an X, Y adjustment of the stage holding the front lens platform, by an arrangement of locating pins and pressure feet that register and hold the rear lens on its holder, and rotational adjustment of the rear lens holder on the laminating axis. A simple and effective arrangement assures that the two lenses are pressed together with uniform pressure that spreads the adhesive evenly between them, and this process can be observed through the rear lens while the pressure is being applied. Then the bonding adhesive is cured while the two lenses are pressed together so that the accuracy of their positioning and the lack of any interruption in the adhesive layer are preserved during the curing process. Several specific procedures and structures contribute to achieving these effects; and the result is described as fast, effective, and more accurate than previous systems. That method of laminating front and rear lenses to form a composite eyeglass lens comprises:

a. holding a front face of the front lens in a mounting aperture positioned relative to a laminating axis;
  b. mounting a rear face of the rear lens in a predetermined position on a holder that is movable along said laminating axis and holds the rear lens independently of the front lens;
  c. rotatably orienting the holder relative to said axis to bring the rear lens into a desired angular relationship with the front lens while the rear lens is separated from the front lens;
  d. placing a bonding material on a rear face of the front lens and moving the holder to bring a front face of the rear lens into engagement with the bonding material and to press the rear lens against the front lens in the direction of the laminating axis to force the bonding material to spread throughout a space between the two lenses; and
  e. curing the bonding material by directing curing radiation through the front lens while pressing and holding the rear lens against the front lens.

Polycarbonate's potential advantages over cast allylics were virtually offset by comparatively poorer abrasion resistance performance and poorer tintability, as well as restricted product line ranges and high manufacturing costs associated with low-volume production. Improved abrasion resistant coatings have overcome these limitations. Readily tintable coatings possessing good abrasion resistance have now become commercially available for polycarbonate lenses. Therefore the last major remaining drawback to the use of polycarbonate is associated with lens availability, breadth of product line, manufacturing costs, and order turnaround time.

The advantages and disadvantages associated with the use of polycarbonate are particularly pertinent and applicable to finished single-vision or multiple-vision lenses, which are supplied with one or both final-front-convex and back-concave optically finished surfaces, and optionally with a factory-applied tintable abrasion resistant coatings (e.g., often referred to in the art as "hardcoatings") on one or both surfaces. To convert such finished single-vision lenses (which constitute nearly half of all U.S. prescriptions filled) requires merely edging the excess lens away to fit a frame, and optionally tinting the lens to desired color with conventional dye baths, if the lens is not already tinted or photochromic.

Polycarbonate finished single-vision lens manufacturing has certain drawbacks which prevent their attaining lowest manufacturing costs and improved availability. A finished single-vision lens is optically defined by two measures of its light-bending power: spherical power (magnification) and cylindrical power (astigmatism correction), with units of power being read in diopters and various (e.g., 0.10, 0.25, etc.) units thereof. A product availability matrix which provides for sphere power ranging from at least about +4 to −6 diopters (with a broader range, e.g., from +6 to −8 easily possible) and cylinder power from 0 to +2 diopters (with a broader range to +3 diopters possible), constituting 273 or more (e.g., to 500) stock keeping units is desired. Within this matrix, there is a unit-volume frequency distribution curve which has at its approximate center a zero-power lens and which generally shows reduced frequency as sphere or cylinder power increases. To satisfy most incoming prescriptions on a statistical basis, a large matrix of stock keeping units must be maintained and inventoried for quick order turnaround if a particular manufacturer or lens type is to become popularly accepted in the market.

In addition to maintaining this wide range of product line, the lens manufacturer must necessarily produce high volumes of such thermoplastic-molded, hardcoated lenses.

Modern molding processes permit prescription lens molding at high yields, with minimal material scrap, without secondary operations of trimming, and with high levels of automation. Additionally, given the number of stock keeping units, each of which has a different statistical frequency distribution, it has become important to be able to run high volumes of differing lenses of differing powers (within some reasonable range) in a short period of time with minimum down time on the molding equipment, without sacrificing productivity, quality or yields. A four-cavity moldset, for example, quadruples the productivity associated with a particular molding machine without proportionately increasing its capital cost (i.e., increasing the capacity from one lens to four lenses may be less than 50% higher). For example, two of the cavities could be used to mold the most popular sphere and cylinder power combination and the remaining cavities could each handle a less popular lens, with more frequent changeovers of the latter cavities.

The lens blanks can be made by many different types of molding processes, including, but not limited to injection molding, stamping, coin pressing, and the like. For example, U.S. Pat. No. 4,828,769 discloses a method for injection molding articles, especially ophthalmic lens blanks, which method comprises forming a closed mold cavity for receiving plasticized resin without introducing significant back pressure therein, injecting into the closed mold cavity a mass of plasticized resin slightly larger than the mass of the article to be formed, applying a main clamp force of the injection molding equipment to reduce the volume of the closed mold cavity, thereby redistributing the resin contained within the cavity, and maintaining the applied main clamp force, thereby compressing the resin at least until the resin within the closed mold cavity solidifies. This one-step method is described as at least addressing some of the problems encountered in prior art injection molding processes when they had been attempted for use with ophthalmic lenses.

However, after the lens blanks are manufactured, it then becomes necessary to join at least the interior and exterior lens blanks to form the composite lens which can be a labor intensive and cost intensive step in the manufacturing process. U.S. Pat. No. 5,433,810 describes a process for the lamination of lens blanks into composite eyeglass lenses. A front face of a front lens is positioned in a mounting aperture relative to a laminating axis. A rear lens is mounted in a predetermined position on a holder that is movable along the laminating axis, with the holder supporting the rear lens (preferably independent of the front lens). The holder is rotatably oriented relative to the axis to bring the rear lens into a desired relationship with the front lens while the rear lens is separated from the front lens. A bonding material (e.g., UV curable adhesive) is placed on the rear surface of the front lens and the holder is moved to place the rear lens into engagement with the front lens and to force the bonding material to spread between the front and rear lens. The bonding agent is then hardened, as by exposing the bonding agent to curing radiation through the front lens.

U.S. Pat. No. 4,969,729 describes the lamination of lens blanks to form a composite lens by placing an adhesive between a front and rear lens then floating the lenses on a heated fluid to cure the adhesive. Indexing holes 17 are provided around the periphery of the lens blanks to assist in the proper relative optical positioning of the lenses with respect to each other. The lenses are rotated about an optical axis and the indexing holes are apparently used in assisting in the alignment of the lenses. A similar lamination process for adhering opposed etched surfaces of lens blanks without requiring the heating or floating in a liquid is described in U.S. Pat. No. 4,892,903, and indexing holes 17 are also described therein.

U.S. Pat. No. 5,399,227 describes a composite eyeglass lens laminating holder and a process used to laminate lens blanks to form a composite lens. The front and rear lenses of a composite ophthalmic lens are laminated together by holding the front lens in an X, Y adjustable stage on a laminating axis and holding a rear lens in a predetermined position relative to the laminating axis. The two lenses are moved together on the laminating axis to spread the adhesive. The rear lens holder is rotatable around a laminating axis and has an adjustable center foot adhesively tacked to the rear lens and an array of surrounding pressure feet for pressing the rear lens uniformly against the front lens. The adhesive between the two lenses is then cured by exposure to UV radiation through the front lens. It is preferred that the front lens has a tab or projection 18 which extends outward from its otherwise circular periphery, the tab to be received with a recess 19 to assure that the front lens has its bifocal region properly oriented on the platform supporting the lens.

It is of course desirable to provide alternative and more effective methods of laminating and curing ophthalmic lenses. One problem that has not been fully addressed by these references is the need to keep the front and rear lenses in center alignment during lamination. This type of centering would be especially critical where a centrifugal or rotational movement might be used to spread the adhesive between the lenses. Such rotational or spinning actions can readily shift the lenses out of their common ophthalmic or laminating axes, or out of ophthalmic alignment with respect to the desired positioning of the lens blank elements when laminated.

SUMMARY OF THE INVENTION

The present invention describes lens blanks, lens blank systems, and process for using the lens blanks in the lamination of at least front and rear lens blanks to form a composite lens, especially an ophthalmic lens for prescription glasses and eyewear. The lens blanks comprise at least a front lens and a rear lens. In one aspect of the invention, there is a pair of ophthalmic lens blanks comprising a front lens blank and a rear lens blank nested (e.g., a convex surface lying against a concave surface) against each other with a liquid, photocurable adhesive between the front lens blank and the rear lens blank, at least one of the front lens blank and the rear lens blank having topography above a surface of at least one of the lens blanks which prevents the other of the lens blanks from slipping out of the nesting contact with the at least one of the lens blanks. The pair of ophthalmic lens blanks may have topography which, for example, is selected from the group consisting of:

a) roughness of a portion of a surface of one of the lens blanks, which portion of a surface is outside of a significant optical area of one of the lens blanks, and which roughness increases the static coefficient of friction between the two lens blanks;

b) at least two protrusions extending from a concave surface of one of the lenses, the other of the lenses nesting within the concave surface, the at least two protrusions extending high enough from the concave surface to make contact with an edge of the other lens nesting within the concave surface; and c) protrusions extending away from a convex side of one of the lens blanks and over an edge of a lens blank nested against the convex side of one of said lens blanks.

In one particular embodiment, the front lens has at least two, and preferably at least three (with more than six being superfluous or redundant and three being preferred) projections or tabs which extend away from the general plane of the lens, e.g., relatively vertically (relatively parallel to the laminating or ophthalmic axis, that is projecting within ±40 degrees of parallelity to the laminating or ophthalmic axis) from the concave rear surface (interior surface) of the front lens, particularly along the edge of the lens or adjacent the edge of the lens. These projections or tabs form a distribution or locus around the edges or outer area of the lens blanks which are able to restrain the movement or slippage of a rear lens inserted within the concavity of the lens, between the projections or tabs. The spacing of the tabs is designed so that the maximum slippage of a rear lens within the concavity between the tabs (e.g., contact of the edges of a rear lens between positions of contact with any single tab or set of tabs) is within the desired tolerances of the alignment of the optical axes of the front and rear lens in the final composite lens structure. One or more other tabs or projections facing outwardly or downwardly from the circumference of the front lens blank may also be present to secure the front face of a front lens blank into a support during lamination. An indentation or groove may also be present on the front lens (outside of the region to be retained within an eyeglass frame) to mate with a projection or tab on a support for the front lens during further processing or lamination. When the unbonded lens blank precombination is spun or centrifuged to spread the adhesive, the two lens blanks are restrained within an acceptable ophthalmic position and aligned within the design tolerances of the process by the tabs which restrain the relative movement of the back lens within the concavity of the front lens.

BRIEF DESCRIPTION OF THE DRAWINGS

FIGS. 3 *a*), *b*) and *c*) show views of a rear lens nested within a front lens with protuberances restricting sliding of the rear lens.

DETAILED DESCRIPTION OF THE INVENTION

It is, of course, essential to the performance of ophthalmic lenses formed as a laminate from multiple lens blanks that the multiple lens blanks be properly oriented and aligned with respect to each other and the ophthalmic prescription requirements of the composite lens. Although the tolerances of lens blank alignment are in a macroscopic range (e.g., less than 3 mm, preferably less than 2.5 mm, more preferably less than 2.0 mm, and most preferably less than 1.5 or less than 1.0 mm separation between the two optical axes of the two lenses, between the lamination axes, or point-to-point alignment of the at least two lenses), these tolerances are easily exceeded in processes effecting the lamination of lenses. Especially in a process where one lens may be somewhat fixed within the laminator, but the other may be secured only by a vertical force (e.g., while that lens may 'float' on a layer of liquid or flowable adhesive and is pressed into contact by only gravity), the rear lens (usually the floating lens) can move out of alignment with the optical axis or position alignment, particularly by sliding along the curve of the interior concave surface of the rear lens. This slippage along the interior surface can occur whether the lenses are associated manually or automatically. It is therefore necessary to design a system and a method of use with that system for aligning ophthalmic lens blanks so that slippage is kept within process and ophthalmic parameters.

It is particularly desirable during the process of laminating two lens blanks together to form a final lens with segmented or progressive ophthalmic characteristics in the combined lens to spread adhesive between the two lens blanks by a mechanical operation such as spinning (one or both lenses) or sliding the lenses to spread adhesive between them. When such mechanical processes are performed, the concentricity or center-to-center alignment of the two lenses can be affected. It is difficult to stop the process and realign the lenses. It is therefore important to have the laminating/adhesive securement process operate in a manner that does not destroy or adversely affect the concentricity or center-to-center alignment of the two lenses. One aspect of the present invention addresses this problem within the field of manufacture of ophthalmic lenses formed by the lamination of two lens blank elements which contribute different features (ophthalmic power, different lens functions, UV absorption, photochromic functionality, tint, abrasion resistance, etc.) to the final laminated lens construction.

Figure 1:
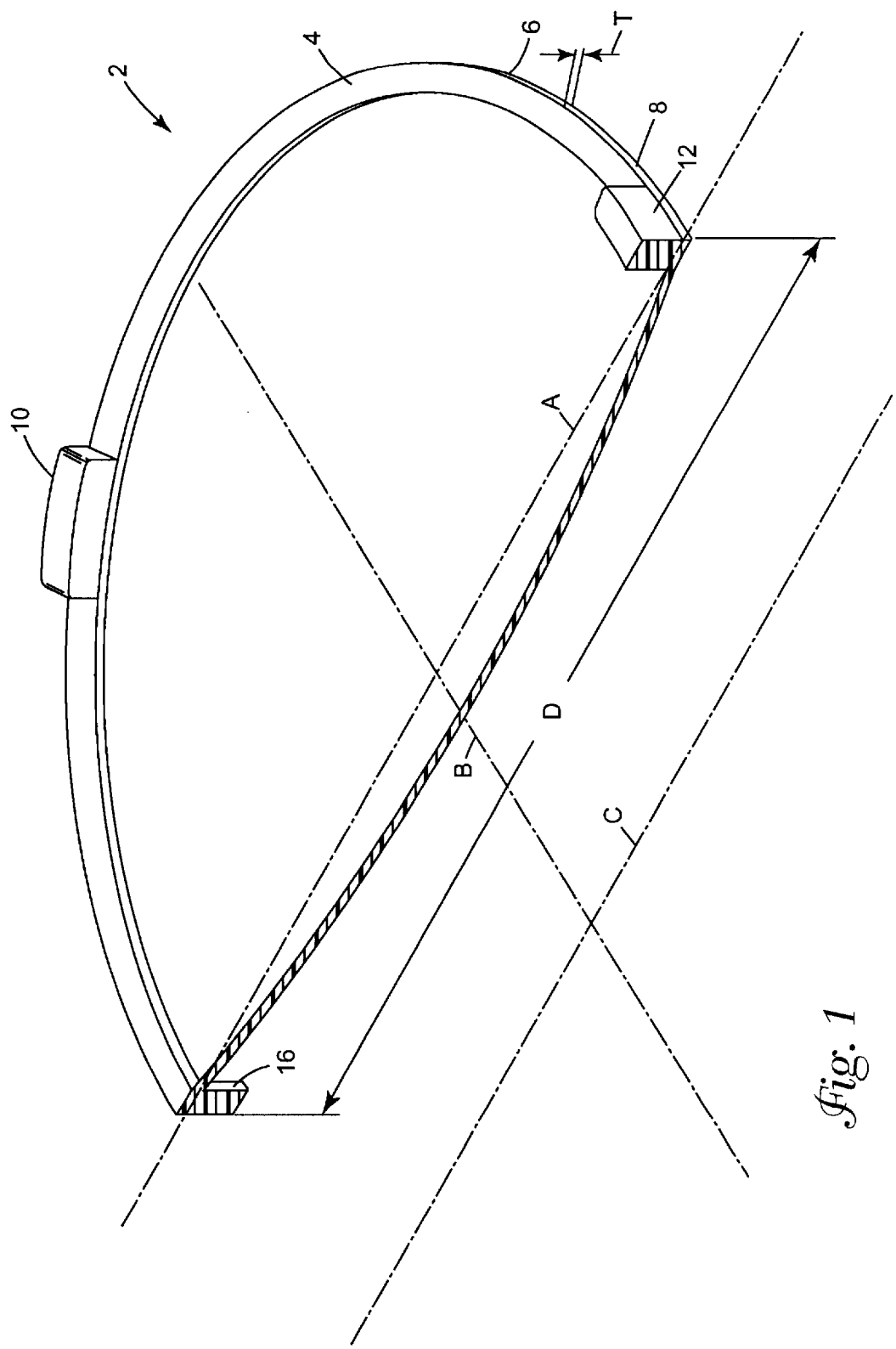
FIG. 1 is a perspective cutaway drawing of a front lens having three alignment projections elevated from its interior side and a positioning tab elevated from its exterior side.

FIG. 1 shows a cutaway view one configuration for a front lens blank 2 according to a practice of the present invention. The front lens blank 2 is shown with a front or exterior side 6 and a rear or interior side 4. There is a rearward facing edge 8 formed by the thickness T of the lens blank 2. There are two projections, tabs or posts 10, and 12 shown facing rearwardly from the edge 8. These posts are shown along one side only of the cutaway view of the lens blank 2, but of course and preferably, there would be three or more posts and the posts would be more evenly distributed so that they are not all on the same side (here the rearward side) of the lens blank 2. The posts 10, and 12 do not have to be precisely aligned or coextensive with the width of the edge 8, but the alignment shown in FIG. 1 is convenient to use and manufacture (molding) of the lens blank 2. The posts 10, and 12 may also be positioned slightly inside the edge or slightly outside the edge 8 so that they are on a front or back surface of the front lens, as long as they project in a direction above the concave surface of the lens to provide a restraint against movement. Also shown in FIG. 1 is a positioning tab 16 which would be positioned within a recess in a support (not shown) to secure the front lens blank 2 during lamination. Virtual lines A, and B define a diameter D within the lens blank 2 which would be used within a frame of optical glasses (not shown). The diameter D should be such that the posts 10, and 12 should or would be removed from the lens blank 2 for insertion into the frame. It is not desirable or particularly beneficial to have the posts on the lens within the frame after completion of the process. Part of the process of the invention, with respect to combining the two lenses to be adhesively secured comprises the removal of the posts or protrusions before insertion of the lenses into frames in an "edging" process.

Figure 2:
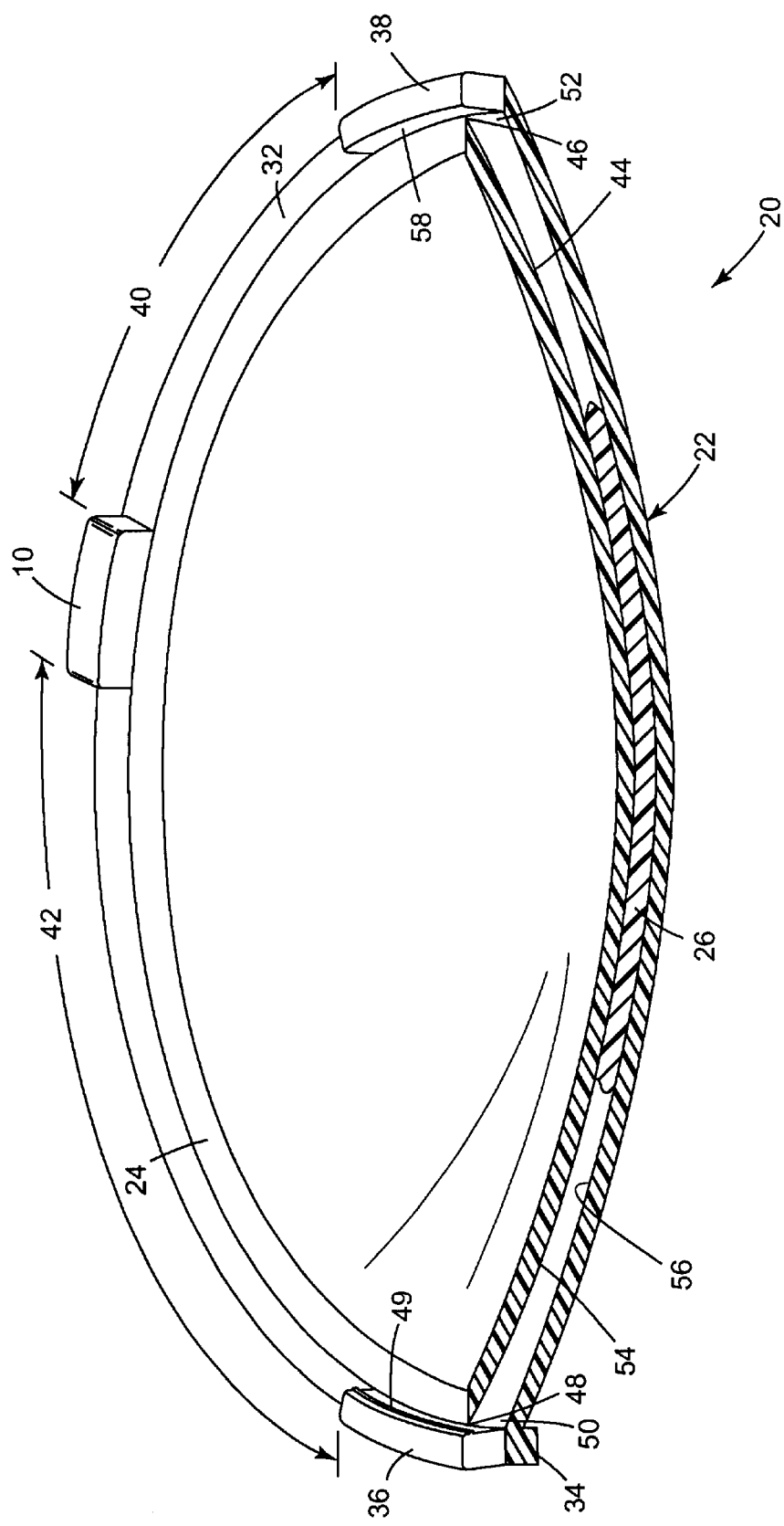
FIG. 2 shows a cutaway view of a prelamination association of a front lens, a rear lens and an intermediate, unspread layer of curable adhesive.

FIG. 2 shows a cutaway view of a prelamination association 20 comprising a front lens 22, a rear lens 24 and an intermediate, unspread layer of curable adhesive 26. Two (of the preferred three) projections 36 and 38 are shown on the backside facing edge 32 of the front lens 22. A positioning tab 34 is also shown on the exterior or front face of the front lens blank 22. As can be seen, there is a angular spacing 40 and 42 (along the circumference of the lens) along the outermost edge 32 of the rear or back lens 24 and the projections 26 and 38. The spacings 40 and 42 are purposefully shown to be different. Although centering of the rear lens 24 with the front lens 22 is typically the target for alignment of the optical axes of the lenses 22 and 24, as long as the tolerances for alignment are met, these spacings 40 and 42 do not have to be equal. In general, the spacing between the inside edges or faces (50 or 52, diagonally or at least crossing over the front lens) should not be able to exceed about twice (two times) the limit of tolerance for alignment of the optical axes of the two lens blanks 22 and 24. In the case where the slippage of the rear lens 24 along the backside 44 of the front lens 22 is at this limit between two posts 36 and 38 of twice the optical axis displacement tolerance, one of the edges 46 or 48 will be touching a projection 36 or 38 and the other spacing 38 or 36 will be at the maximum of twice the tolerance or optical axis misalignment. A ridge element 49 may also be located on one or more projections (e.g., shown here on 36) to restrict slippage or to assure that slippage or lifting is avoided. A roughening of the surface of the lens outside of the prescription viewing area of the final lens (e.g., near the outer edges of he lens blank) on the inside surface, forward facing surface 54 or the interior surface 56 of the front lens 22 or the inside surface of a projection 58 can also be used to assure that the projection 38 reduces the degree of slippage of the rear lens blank 24 desired in the lamination of the front and rear lenses. A groove or complete ledge around the exterior of the lens blank, or any other configuration or feature which physically restrains, reduces or prevents slippage between the lenses beyond the tolerance of alignment can be used. It is of course important for this feature or a combination of features to assure concentricity or center-to-center alignment of the front lens and the rear lens.

The present invention is particularly beneficial in the manufacture of lens blanks for use in commercial lens-fitting or eyeglass frame shops where completed products can be provided in a minimum amount of time, such as in less than half-an-hour or even less than twenty minutes. The laminated lenses should have a center thickness or an edge thickness (depending upon the type of lens curvature, as to whether it is thinner or thicker in the center as compared to being thicker or thinner at the edge) of less than 2.2 mm, preferably less than 2.0 mm, often within a preferred range of 1.5 to 22 mm, and a more preferred range of about 1.7 to 2.1 or 1.8 to 2.0 mm. The sphere, cylinder and add powers of the laminated lens should have tolerances of +/−0.12 D or +/−0.10 D. In the normal process of providing laminated lens products which comprises 1) lens molding, 2) hard coating (the application of an abrasion resistant layer), 3) antireflective coating, 4) edging, 5) laminating, and 6) placing the finished product into a lens frame, steps 1), 2) and 3) can be performed before the lens is provided to the frame shop or ophthalmologist or optometrist.

FIG. 3a) shows a top view of a pair of lenses according to one configuration of the present invention. The non-adhesive association 100 of a rear lens 102 nested within a front lens 104 is shown with three posts 106, 108 and 110 confining the rear lens 102 against slippage. This confinement is accomplished by the three posts 106, 108 and 110 contacting the edge 112 of the rear lens 102 when the real lens slides along the concave surface of the front lens 104.

The rear lens 102 may tightly or snugly fit between the three posts 106, 108 and 110, but it is more likely that there will be some play or space between the edge 112 and the three posts 106, 108 and 110 when the rear lens is nested on the concave surface of the front lens. Virtual lines A—A and B—B merely show the intersection of diameters of the two lenses 102 and 104.

FIG. 3b) shows a perspective view of the non-adhesive association 100 of FIG. 1. Dashed lines 120 and 122 show the limits of movement of the rear lens 102 between the three posts 106, 108 and 110 when the rear lens 102 is shifted from contact with posts 108 and 110 (with space remaining between the edge 112 and the post 106, and then the edge 112 is shifted into contact with post 106. The distance between dashed position lines 120 and 122 represents the distance of maximum slippage s between the edge of the lens 112 and the system of three posts 106, 108 and 110. This can be further visualized in FIG. 3c). In this cutaway side view of the nonadhesive association 100 of the rear lens 102 nested within the concave face of the front lens 104, the edge 112 of the rear lens 102 is shown flush with or in contact with post 110. (Post 108 is not shown for convenience, although the edge 112 should be considered to be in contact with post 108 also). A space s exists between the edge 112 and the post 106. A front lens protrusion 16 for engagement with a support surface (not shown) is also shown. That protrusion 16 is shown outside of the major optical area provided by the front lens 102, so that upon machining, edging, cutting or the like of the final lens to fit a frame, the protrusion 16 would be removed from the laminated final lens assembly.

A benefit of the present invention is the ability to provide to a shop customer a series or set of lenses from which a wide variety of different prescriptions can be made. For example, sets of interior lenses and sets of exterior lenses (front and back lenses) can be provided to the customer. The individual lens halves may be combined in the shop, the tabs or protrusions acting to maintain the alignment during lamination, and the laminated lens may be then ground, machined, edged, lapped or cut to fit the desired frame. As the lamination step can be done rapidly, the total time involved in the shop is selection of the front and back lens based upon a prescription and desired physical properties of the lens (color, reflective properties, and number of scratch resistant surfaces), insertion of the lenses into an automated system, lamination of the lens, mechanical edge grinding to shape the laminated lens, and insertion into a frame. This complete process can be done under thirty minutes with the present technology, and be accomplished with a high degree of quality and assurance of correctness and accuracy.

The sets of lenses can be provided with a range of prescriptions within the normal distribution of prescriptions. About five hundred different types of lenses, differing in curves (e.g., the front lens could have segmented correction for farsightedness or the continuous lens of no-line correction for farsightedness), level of correction (at least 0.1 diopters difference between lens blanks, preferably at least 0.2 diopters differences, more preferably at least 0.25 or about 0.25 diopters difference up through a maximum range of about ±3.0, ±4.0 or more of diopter range). The back lenses will usually just have the prescription portion from about +3 to −5 diopters (at least 0.1 diopters difference between lens blanks, preferably at least 0.2 diopters differences, more preferably at least 0.25 or about 0.25). In the back lens, an additional variation that would be provided is in the cylinder of the lens. This would range from 0.00 up to about −2.00, again with the same level of incremental variation as the diopters corrections for the other variable aspects ((at least 0.1 diopters difference between lens blanks, preferably at least 0.2 diopters differences, more preferably at least 0.25 diopter increments or about 0.25 diopters). In this manner a set of front lenses would have variations of color, scratch resistance, diopter, line or no-line correction and the like, and a set of back lenses would have the possibility of these same variations, without the line or no-line nearsightedness correction. Only one of the sets of lenses should have the color option, but both sets may have the option and include colorless lenses as an option.

At least one problem which the prior art has had to encounter in attempting to make laminated or composite lenses, but which has not been addressed in those processes, is attempting to use photoinitiated curing of the adhesive with non-visible radiation when the lenses are desired to be initially untinted, have an ultraviolet (UV) radiation absorbing coating or a UV absorbing lens composition, and/or wish to have a non-colored adhesive layer. As UV absorbing coatings or UV absorbing lens compositions would screen out substantial amounts of the applied initiating energy (UV coatings usually absorbing at least 95% and often over 99% of incident ultraviolet radiation), the exposing energy and/or duration must be extended significantly to assure complete curing of the adhesive layer. If visible radiation spectral sensitization were to be used, visible color contribution to the lens would be contributed to the adhesive composition which would undesirably blend with any tint placed on the lens. Even if one tint matched the color contribution of the sensitizer, the sensitizers would have to be changed for each color tint, and this would require changes in processing compositions and/or conditions for each lens tint selected. It would therefore be desirable to design a UV curing lamination process which can be used with ophthalmic lenses without requiring extended cure time or which adversely contribute coloration to the lens.

An aspect of the present invention therefore also comprises a process for the lamination of optical elements, including for example ophthalmic lenses, which optical elements absorb at least 95% of any ultraviolet radiation component between 180 and 380 nm of incident radiation and allows at least 40% transmittal of at least one wavelength of ultraviolet radiation between 385 and 410 nm, the process comprising the steps of providing a first optical elements, such as an ophthalmic lens, having an interior and exterior surface. Placing a UV radiation curable adhesive on the interior surface of said first optical element, the UV radiation curable adhesive having a sensitivity within the range of 385 to 410 nm, which range of sensitivity for the curable adhesive is preferably within at least 15 nm of the wavelength emission maxima of curing radiation from a source (e.g., if the peak sensitivity were 385, the emission of the radiation source [if it has a narrow waveband distribution of radiation, such as a waveband of less than 30 nm] should be within ±15 nm of that peak sensitivity). Placing an interior surface of a second ophthalmic lens into contact with said adhesive, said second ophthalmic lens (or optical element) absorbing at least 95% of any ultraviolet radiation component between 180 and 380 nm of incident radiation and allowing at least 30% transmittal (preferably at least 40% transmittal) of at least one wavelength of ultraviolet radiation between 385 and 410 nm. The adhesive is then distributed between the two optical elements (e.g., by pressure or more preferably by centrifugal force or radial forces from spinning or centrifuging). The adhesive is then exposed to UV radiation having a significant amount of energy at a wavelength within the wavelength range of from 385 to 410 nm to cure said adhesive (e.g., a significant amount would cure the adhesive or irreversibly initiate the cure of adhesive in less than thirty (3) seconds, preferably less than twenty (20) seconds and more preferably less than ten (10) or less than five (5) or even less than one (1) second.

One method for forming a laminated optical element according to the invention comprises the steps of:
 a) positioning a first optical element having an interior surface, an exterior surface and an edge defining a circumference, the first optical element
  I) absorbing at least 95% of any ultraviolet radiation component between 180 and 380 nm of incident radiation and allows at least 30% or at least 40% transmittal of at least one wavelength of ultraviolet radiation between 385 and 410 nm, and
  ii) having at least two projections extending at an angle which directs them above the edge on the same side of said first optical element as the interior surface,
 b) applying a photopolymerizable adhesive composition on the interior surface of the optical element, the photopolymerizable adhesive composition being curable by UV radiation having a wavelength of between 385 and 410 nm, and the maximum spectral sensitivity of the photopolymerizable composition being within 15 nm of UV radiation having a wavelength of between 385 and 410 nm (and preferably between 370 and 410 nm, more preferably between 380 and 405 nm),
 c) positioning a second optical element having an interior surface and an exterior surface on the polymerizable adhesive composition and between said at least two projections, with an interior face of said second optical element being in contact with the polymerizable adhesive composition to form a prelaminated association, the second optical element absorbing at least 95% of any ultraviolet radiation component between 180 and 380 nm of incident radiation and allows at least 30% or at least 40% transmittal of at least one wavelength of ultraviolet radiation between 385 and 410 nm, and
 d) irradiating the prelaminated association with UV radiation having a significant wavelength component between 385 and 410 nm to cure the adhesive and to laminate said first and second optical element.

The lenses should have the projections or tabs described previously in a practice of the present invention. These projections should be provided in an arrangement so that they form movement-limiting positions for the second optical element (usually the back lens) as it slides along the interior surface of the first optical element. Those movement limiting positions should be such that when the second optical element is slid along the interior surface of the first optical element, the movement is limited by the tolerances or parameters allowed between the optical elements. Viewing the base position of the second lens within the interior surface of the first optical lens as either the balancing point (e.g., the point of lowest center of gravity residence of the second optical element (or lens) within the first optical element (or lens)) or any other stable positioning point where the operator places the lens in an approximately desired position with the optical axes of the two optical elements having a predetermined degree of separation, the projections should be placed so that the second optical element cannot slide beyond the tolerances for that desired base position. For example, with three projections aligned from about the edge upward relative to the interior surface (that is on the same side of the lens as the concave surface and moving away from that surface, but not completely parallel to the plane of the edge), a second optical element placed within the circumference of the edge and limited in movement by the projections so that a first edge should not move from a position touching a first projection (or set of two projections) to another position wherein a second edge is touching a second projection (or second set of projections) and have the first edge move more than twice the lamination tolerance (the optical displacement tolerance of the optical centers of the two lenses). For example, if the optical centers for the two lenses could be at most 3 mm out of optimum alignment, the first edge of the second optical element could not shift more than 6 mm when moving from contact with the first projection until a second edge came into contact with a second projection. This limitation on movement should exist as between all positions and all projections which may contact the edge of the second optical element. That is, when the edge of the second element is in contact with a first projection, the edge should not be capable of any sliding movement (without rotation) towards contact with another projection which would allow the edge to move more than twice the tolerance for alignment. It is preferred that this movement of an edge of the second lens be limited with ophthalmic lenses to less than 5 mm, more preferably less than 4 mm, still more preferably less than 3 mm, and most preferably less than 2.5 or less than 2.0 mm or less than 1.0 mm or less than 0.5 mm between contact positions with projections on the edge of a first lens.

This method is especially useful where the first and second optical elements comprise ophthalmic elements and the two optical elements are laminated to form a segmented or continuous lens blank. It is preferred that the adhesive is spread in a continuous film between the first and second optical elements before photopolymerization of the adhesive. The spreading of the adhesive may be performed by spinning the two lenses with a flowable adhesive layer between the lenses (on the rear or interior surface of the front lens and forward or interior surface of the back lens) to cause the adhesive to flow between the two lenses or by applying pressure against the two lenses to squeeze the flowable adhesive between the two lenses, or reducing the air pressure at the sides of the lenses to draw the flowable adhesive towards the edges of the lenses.

The optical elements of the present invention may comprise any at least two optical elements (either purely transmissive, without wave form or pattern alteration, refractive, diffusive, corrective, and/or ophthalmic elements). The two optical elements are joined by an adhesive to form a single structure having a combined, continuous, segmented, sequential, series or parallel optical function. Such optical elements can include ophthalmic lenses, panel displays, optical disks, monitor screens, magnifying glasses, and the like.

The optical element material is a polymeric material, preferably a thermoplastic polymeric material, but crosslinked or cured polymeric materials are also particularly useful. The individual lens blanks are typically made by molding or casting, with or without additional mechanical or chemical sizing or grinding. Typical polymeric materials include, but are not limited to polycarbonates, poly (ethylenically unsaturated) polymers such as poly(m) acrylates (this designation including both acrylates and methacrylates), polyurethanes, polysiloxanes, polyolefins, polyvinyl resins (e.g., vinyl acetates or triacetates, polyvinylidene chloride, polyallylic resins, etc.), polyamides, etc. The optical elements, as previously indicated must have UV absorbing properties to require the practice of the present invention. These UV absorbing properties (absorbing at least 95% of any ultraviolet radiation component between 180 and 380 nm of incident radiation and allowing at least 30% or at least 40% transmittal of at least one wavelength of ultraviolet radiation between 385 and 410 nm) may be contributed by the composition of the polymer (either its native spectral properties or by inclusion of additives such as dyes, pigments and UV absorbing materials) or by coatings or treatments on the surface of the optical element. Normally these properties are provided by coatings or treatments on the surface of the optical element. Typical materials which are used to provide UV absorption in the desired spectral range (absorbing at least 95% of any ultraviolet radiation component between 180 and 380 nm of incident radiation and allowing at least 30% or at least 40% transmittal of at least one wavelength of ultraviolet radiation between 385 and 410 nm) are pigments such as 'invisible' zinc oxide (zinc oxide particles which are so fine as to not interfere with the non-diffractive transmission of visible radiation), UV absorbing dyes (e.g., aminoallylidenemalononitrile compounds, oligomers, and polymers), and the like. The Tinuvin™ UV Absorbers available from Ciba-Geigy are examples of other classes of commercially available dyes with specifically tailored UV absorbing characteristics, especially characteristics which match those required for ophthalmic lenses. The aminoallylidenemalononitrile compounds are also recognized in the literature (U.S. Pat. Nos. 4,576,908; 4,307,184; and 3,253,921) as being able to provide UV absorption within the far UV without a significant or readily observable tail extending into the visible spectrum. Coatings of these UV absorptive materials in a binder or carrier are applied to the lenses by conventional treatments such as dip-coating, spraying, condensation coating or applicator contact, and then dried or cured by conventional techniques known to those skilled in the art.

The adhesive composition may be and preferably is any photocurable composition having adhesive activity towards the optical elements and which has a native photosensitivity or can be photosensitized to ultraviolet radiation within the wavelength range of 385 to 410 nm, preferably from 385 to 405, more preferably from 385 to 400 and most preferably from about 387 to 397 nm. Even though photoinitiators tend to have sensitivity within the broad UV range, all photoinitiators which may be useful for a particular polymerizable composition do not necessarily have native sensitivity to the desired range of the UV spectrum and will have to be spectrally sensitized to that range. Most photoinitiators (such as the s-triazines and halogenated triazines, aryl onium initiators [triaryl sulfoniums, diaryl iodoniums] as described in U.S. Pat. No. 4,971,892, biimidazoles and the like do tend to have strong absorption and initiation ability in the far UV (between 350 and 410 nm). If needed, merocyanine dyes, especially those with a constrained alkylamino group may be used to increase the sensitivity of the polymerizable system. These sensitizers should be carefully selected to avoid spectral absorption properties within the visible range of the spectrum, which could add coloration issues to their use.

The adhesive material is preferably an ethylenically unsaturated polymerizable material and most preferably a monomer, oligomer or polymer (or combination thereof) having ethylenically unsaturated groups, especially acrylic or methacrylic groups (generically included within the term (m)ethacrylic). These materials do not have to be derived from monomers which are exclusively of an acrylic nature, and in fact preferably comprise polymer-backbones other than acrylic materials with pendant acrylic groups or with graft or block copolymers with acrylic groups. For example, urethane backbones (e.g., U.S. Pat. No. 4,304,923), polyester backbones, vinyl resin (e.g., polystyrene) backbones, polysiloxane resin backbones and the like with (m)ethacrylic functionalities are highly desirable and commercially available. Monomers which are capable of more than two-dimensional structuring in their cures (e.g., crosslinkable monomers) are also desirable. Such materials as trimethylolpropanetriacrylate, pentaerythritol tetraacrylate and triacrylate may be used to that effect. Comonomer such as (m)ethacrylic acid, (m)ethacrylic anhydride, n-butylacrylate, isobornyl (m)ethacrylate, and the like may be used to advantage in the compositions of the present invention. The terminology of (meth)acrylic, for example, indicates that either the acrylic or methacrylic analogs may be used.

In practicing the process of the present invention, certain significant improvements, in addition to the general process can be provided by particular steps in the process, independent of or in conjunction with the curing particulars. For example, when the second optical element is contacted with the adhesive, it has been found that if this step is performed by contacting the interior surface of the second optical element sufficiently to wet at least an area of the interior surface, then the contact is broken between the adhesive remaining on the first optical element interior surface and the adhesive which has wet the interior surface of the second optical element so that a separation is between the lenses, and then the wet interior surface of the second optical element is again placed into contact with the adhesive on the interior surface of the first optical element, problems with air entrapment and bubbles are significantly reduced. The adhesive composition is then cured by irradiation. The process would therefor require only a) positioning a first optical element having an interior surface and an exterior surface, b) applying a photopolymerizable adhesive composition on the interior surface of the optical element, c) positioning a second optical element having an interior surface and an exterior surface on the polymerizable adhesive composition with an interior face in contact with the polymerizable adhesive composition to form a first prelaminated association, d) relatively moving said second optical element away from said first optical element, breaking contact between said first optical element and said second optical element, with a surface of said second optical element having been wet by said adhesive, e) placing said wet surface of said second optical element into contact with the adhesive on the interior surface of said first optical element to form a second prelaminated association, f) spreading the adhesive between the first and second optical elements (preferably by spinning the two lenses with the adhesive between them so that centrifugal forces, and any concomitant pressure, causes the adhesive to flow between the two optical elements, and g) irradiating the second prelaminated association (e.g., with UV radiation) to cure the adhesive and to laminate said first and second optical elements.

This aspect of the processing also utilizes the projections to limit the movement of the second lens within the interior surface of he first lens during the spinning step to prevent misalignment of the second optical element beyond the tolerances of the element.

This method is especially useful where the first and second optical elements comprise ophthalmic elements and the two optical elements are laminated to form a segmented or continuous lens blank.

The projections should be spaced around the edge, rather than being only within a single quadrant or a single half of the circumference of the optical element. Where the front optical element is approximately round, the projections should be spaced approximately equally around the circumference. For example, the projections may be spaced at about 120 degrees (±15 degrees) with a circular cross-section, or 90 degrees (±15 degrees). The projections may have roughened surfaces, ledges, lips, indentations, projections or the like to assist in restricting movement of the edge of the back lens against these posts or projections.

To assist in the identification of lenses to be chosen for lamination, strippable polymeric or paper films of different color or other identifying features may be placed over each type of lens depending upon its optical (e.g., dioptic) properties. For example, not only may films (including paper and polymeric film) be adhered to a surface by adhesive, certain cling films may be adhered to the polymeric surface so that no adhesive residue is left on the surface. Many lens manufacturers already put polymeric films on their lenses to show their logos, so it would be a simple matter to provide uniquely colored and/or uniquely patterned and/or uniquely shaped films to the lenses to identify their particular prescriptive value, their particular hardness treatment, the presence of no-line corrections (which can not be readily seen), cylinder variations, and the like. Individual films or adhesively secured tabs can contain all of this information in a readily accessible format. The format may be visually accessible or may be read by a scanner for authentication of the prescription. With 500 different lens blanks probably available, it would be most facile to use coding of shapes, patterns and/or colors to differentiate the lenses, along with alphanumerics on the film (in addition to Trademark or logo presentations).

EXAMPLES

The lens wafers were molded consisting of 80 mm polycarbonate PAL front wafers and 75 mm polycarbonate SV back wafers. Each of the wafers was molded with a 0.8 mm+/−0.10 mm center thickness. Three tabs were located 120° apart around the outside edge of the back of the front wafers. These tabs were used to align the center of the two lens wafers.

Once molded, the wafers were checked for through power on the Humphry and the center thickness measured. The results are recorded in Tables 1 and 2 below.

TABLE 1

Front wafer characteristics

| Lens ID | Humphry base powder | Humphry add power | Center thickness, c.t., (mm) |
|---|---|---|---|
| 82214 | −0.87 × −0.09 | 1.15 | 0.87 |
| 83412 | −0.92 × 0.00 | 1.18 | 0.86 |

TABLE 2

Back wafer characteristics

| Lens ID | Humphry base power | Center thickness, c.t., (mm) |
|---|---|---|
| LMA4.97/4.98 × 0.00 | −0.3 × 0.00 | 0.84 |
| LMA4.97/4.98 × 0.00 | −0.1 × 0.00 | 0.84 |
| LMA4.97/4.98 × 0.00 | −0.02 × 0.00 | 0.87 |
| LMA4.97/4.98 × 0.00 | −0.01 × 0.00 | 0.87 |
| LMA4.97/4.98 × 0.00 | −0.02 × 0.00 | 0.88 |

A scratch resistant hard coating was applied to the lens wafers such that the coating was on the non-interface only. Once the hardcoating was applied, the samples were coated with an antireflective coating only on the non-interface surface. Each lamination wafer sample was edged to remove any flash and standardize the diameter. The 80 mm front wafers were edged to 79 mm+/−0.5 mm and the 75 mm back wafers were edged to 74.25=/−0.25 mm.

Lamination Process:

The lens wafer samples were laminated using the Beta prototype model of a proprietary BMC Vision-Ease samples were wiped clean with IPA to remove any dust and particulates. The front and back wafers were placed in their respective fixtures and the back wafer aligned for the proper axis of prescription. The front lens had three posts distributed around the rearward edge of the lens. The three posts were approximately 120 degrees from each other around the edge and were about 3 mm in height above the edge (protrusions less than or greater than 3 mm will work, especially between 0.2 and 3.0 mm). The position of the posts around the outer edge of the front lens did not allow the rear lens to slide more than 2.0 and 2.5 mm in any linear distance between each pair of posts amongst the three posts. The actual clearance between the rear lens and the posts on the front lens was approximately 0.5 mm when centered. It is of course also possible to have posts on the rear lens which extend over the edge of the front lens, much in the manner of a claw, to restrict the relative movement of the front lens and to keep the lenses in concentric orientation or center-to-center alignment.

Once the wafers were positioned the operator's door was closed and the start button pressed. The adhesive dispensing arm is positioned over the front wafer. The dispensing tip is lowered to the surface of the front wafer and 0.56 g+/−0.01 g of adhesive (a UV curable acrylate adhesive) is dispensed onto the back surface of the wafer.

As the dispensing event occurs, a second arm picks up the back wafer. This arm positions the center of the back wafer over the center of the front wafer. The arm releases the back wafer once the wafer meets the adhesive.

The assembled lens combination is drawn into the lamination chamber. The fixture begins to spin the assembled lens wafers spreading the adhesive by centrifugal motion. The rotational speed can be from 100 rpm to as high as 400 rpm. For this example, the rotational speed did not exceed 250 rpm. Once the adhesive is spread, a shutter opens exposing the lens wafers and adhesive to a UV/Visible light source. This light source cures the adhesive. After the adhesive is cured, the shutter closes and the fixtures returns the laminated lens wafers to its home position.

The finished laminated lens was removed from the device once the cycle was complete. The lens product was measured on the Humphry and the results recorded Table 3 below.

TABLE 3

Laminated lens product characteristics

| Front lens ID | Humphry base power | Humphrey add power | c.t.(mm) |
|---|---|---|---|
| 84412 | −1.02 × 0.00 | 1.18 | 1.86 |
| 83412 | −1.00 × 0.00 | 1.18 | 1.87 |

Before insertion into commercially available eyeglass frame, the finished laminated lens was edge ground to the shape of the frame opening, removing the tabs, and then manually inserted into the frame.

What is claimed:

1. A pair of ophthalmic lens blanks comprising a front lens blank and a rear lens blank nested against each other with a liquid, photocurable adhesive between said front lens blank and said rear lens blank, at least one of said front lens blank and said rear lens blank having topography above a surface of at least one of said lens blanks and on a surface of one of said lens blanks which prevents the other of said lens blanks from slipping out of nesting contact with said at least one of said lens blanks wherein said topography is selected from the group consisting of: a) at least two protrusions extending from a concave surface of one of said lens blanks, the other of said lens blanks nesting within said concave surface, said at least two protrusions extending high enough from said concave surface to make contact with an edge of said other lens blank nesting within said concave surface; and b) protrusions extending away from a convex side of one of said lens blanks and over an edge of said other lens blank nested against said convex side.

2. A polymeric front optical element blank comprising an optical element having an exterior convex surface, an interior concave surface, and an edge, said optical element having at least two projections on said convex surface or on said concave surface extending away from and higher than a portion of said interior concave surface which contact an edge of a rear optical element nested against said convex surface or said concave surface and prevent the rear optical element from slipping out of nesting contact with said front optical element.

3. The polymeric front optical element blank of claim 2 wherein there are at least three projections extending away from said interior concave surface of the front optical element blank.

4. The polymeric front optical element of claim 3 comprising an ophthalmic lens blank.

5. The polymeric front optical element blank of claim 4 wherein said blank comprises a polycarbonate resin.

6. The polymeric front optical element blank of claim 4 wherein said blank comprises a molded blank consisting essentially of polycarbonate resin.

7. The polymeric front optical element blank of claim 4 wherein there is at least one protrusion on a convex surface which does not contribute to prescription ophthalmic properties in said ophthalmic lens blank.

8. The polymeric front optical element blank of claim 4 wherein said blank has a UV absorbing coating on a convex surface thereof.

9. The polymeric front optical element of claim 4 wherein said projections are at least 1 mm in height.

10. The polymeric front optical element of claim 4 wherein said front optical element projections are at least 2 mm in height over said edge.

11. A set of at least ten different polymeric front optical elements according to claim 2 wherein each of said at least ten optical elements differs in diopter by at least 0.1 diopters difference between each optical element.

12. A set of at least ten different polymeric front optical elements according to claim 4 wherein each of said at least ten optical elements differs in diopter by at least 0.2 diopters difference between each optical element.

13. A set of at least ten different polymeric front optical elements according to claim 2 wherein each of said at least ten optical elements differs in diopter by at least 0.25 diopters difference between each optical element.

14. A set of at least ten different polymeric front optical elements according to claim 2 wherein each of said at least ten optical elements differs in diopter by at least 0.25 diopters difference between each optical element, and each optical element has a removable label thereon which identifies optical properties of the optical element.

15. A set of at least ten different polymeric front optical elements according to claim 4 wherein each of said at least ten optical elements differs in diopter by at least 0.1 diopters difference between each optical element.

16. A pair of polymeric optical elements comprising a front optical element blank and a rear optical element blank to be laminated comprising
  a) a polymeric front optical element blank comprising an optical element having an exterior convex surface and an interior concave surface, with an edge extending between said exterior convex surface and an interior concave surface, said polymeric front optical element having at least two projections extending away from and higher than the concave surface of the polymeric front optical element blank, said at least two projections having a linear distance between them, and
  b) a polymeric rear optical element blank, the diameter of said polymeric rear optical element blank being less than said liner distance, but no more than 2.5 mm less than said linear distance,
a convex surface of said polymeric rear optical element blank lying contiguous with a concave surface of said polymeric front optical element blank wherein the at least two projections extending away from the concave surface of the front optical element blank to make contact with an edge of said rear optical element blank nested against said surface which prevents said rear optical element blank from slipping out of nesting contact with said front optical element.

17. The pair of optical elements of claim 16 wherein the diameter of said polymeric rear optical element is less than said linear distance, but is no more than 2.0 mm less than said linear distance.

18. The pair of optical elements of claim 16 wherein each of said optical elements is an ophthalmic lens.

19. The pair of optical elements of claim 18 wherein each of said optical elements is an ophthalmic lens.

20. A polymeric front optical element blank comprising an optical element having an exterior convex surface and an interior concave surface, with an edge extending between said exterior convex surface and said interior concave surface, said optical element having at least two projections, formed from the same polymer as the optical element, extending away from and higher than the concave surface which contact an edge of a rear optical element nested against said convex surface or said concave surface and prevent the rear optical element from slipping out of nesting contact with said front optical element.

21. The optical element blank of claim 20 wherein said at least two projections comprise at least three projections integrally formed with said front optical element.

22. The optical element blank of claim 21 wherein said front optical element comprises an ophthalmic lens.

23. The optical element blank of claim 22 wherein said lens and said at least three projections comprise a polycarbonate.

24. A pair of ophthalmic lens blanks comprising a front lens blank and a rear lens blank nested against each other with a liquid, photocurable adhesive between said front lens blank and said rear lens blank, at least one of said front lens blank and said rear lens blank having topography above a surface of at least one of said lens blanks which prevents the other of said lens blanks from slipping out of nesting contact with said at least one of said lens blanks wherein the topography comprises at least three projections on a surface of said front lens blank to make contact with an edge of said rear lens blank nested against said surface which prevents said rear lens blank from slipping out of nesting contact with said front lens blank wherein the topography would be machined, edged, or cut from the final lens to fit a frame and be removed from the laminated final lens assembly, and which roughness increases the static coefficient of friction between said two lens blanks.

* * * * *